United States Patent
Liu et al.

(10) Patent No.: US 11,640,363 B2
(45) Date of Patent: May 2, 2023

(54) MANAGING A SMART NETWORK INTERFACE CONTROLLER (NIC) OF AN INFORMATION HANDLING SYSTEM

(71) Applicant: Dell Products L.P., Round Rock, TX (US)

(72) Inventors: Wei G. Liu, Austin, TX (US); Karl W. Rasmussen, Temple, TX (US)

(73) Assignee: Dell Products L.P., Round Rock, TX (US)

(*) Notice: Subject to any disclaimer, the term of this patent is extended or adjusted under 35 U.S.C. 154(b) by 146 days.

(21) Appl. No.: 17/365,091

(22) Filed: Jul. 1, 2021

(65) Prior Publication Data

US 2023/0004508 A1  Jan. 5, 2023

(51) Int. Cl.
*G06F 13/20* (2006.01)
*G06F 9/50* (2006.01)
*G06F 9/4401* (2018.01)

(52) U.S. Cl.
CPC .......... *G06F 13/20* (2013.01); *G06F 9/4406* (2013.01); *G06F 9/5016* (2013.01)

(58) Field of Classification Search
CPC .......... G06F 13/20; G06F 9/4401; G06F 9/50
See application file for complete search history.

(56) References Cited

U.S. PATENT DOCUMENTS

| | | | |
|---|---|---|---|
| 11,221,858 B1* | 1/2022 | Hormuth | G06F 9/4416 |
| 2020/0019708 A1* | 1/2020 | Puthillathe | H04L 63/10 |
| 2020/0301714 A1* | 9/2020 | Dasar | G06F 3/0658 |
| 2020/0301719 A1* | 9/2020 | Castillo | G06F 9/4411 |
| 2021/0226846 A1* | 7/2021 | Ballard | H04L 41/0843 |
| 2022/0216984 A1* | 7/2022 | Liu | H04L 9/0891 |

* cited by examiner

Primary Examiner — Henry Tsai
Assistant Examiner — Christopher A Daley
(74) Attorney, Agent, or Firm — McDermott Will & Emery LLP

(57) ABSTRACT

In one embodiment, a method for managing a smart network interface controller includes: sending a request for estimated resource requirements associated with the smart network interface controller to a baseboard management controller of the information handling system, the estimated resource requirements indicating estimated system resources likely to be required by emulated devices of the smart network interface controller; receiving the estimated resource requirements from the baseboard management controller; initializing the estimated system resources based on the estimated resource requirements; enumerating system resources for one or more additional devices of the information handling system; determining that the smart network interface controller is in a ready state; identifying actual resource requirements associated with the smart network interface controller indicating actual system resources required by the emulated devices of the smart network interface controller; and enumerating the actual system resources for the emulated devices of the smart network interface controller.

20 Claims, 3 Drawing Sheets

300

```
┌─────────────────────────────────────────────────────┐
│ SEND, BY A BASIC INPUT/OUTPUT SYSTEM (BIOS), A      │
│ REQUEST FOR RESOURCE REQUIREMENTS ASSOCIATED WITH   │
│ SMART NETWORK INTERFACE CONTROLLER (NIC).           │
│ 310                                                 │
└─────────────────────────────────────────────────────┘
                          ↓
┌─────────────────────────────────────────────────────┐
│ RECEIVE, BY THE BIOS, THE RESOURCE REQUIREMENTS.    │
│ 320                                                 │
└─────────────────────────────────────────────────────┘
                          ↓
┌─────────────────────────────────────────────────────┐
│ INITIALIZE, BY THE BIOS, ESTIMATED SYSTEM RESOURCES │
│ BASED ON THE RESOURCE REQUIREMENTS.                 │
│ 330                                                 │
└─────────────────────────────────────────────────────┘
                          ↓
┌─────────────────────────────────────────────────────┐
│ ENUMERATE, BY THE BIOS, SYSTEM RESOURCES FOR        │
│ ADDITIONAL DEVICES OF INFORMATION HANDLING SYSTEM.  │
│ 340                                                 │
└─────────────────────────────────────────────────────┘
                          ↓
┌─────────────────────────────────────────────────────┐
│ DETERMINE, BY THE BIOS, THAT SMART NIC IS IN A      │
│ READY STATE.                                        │
│ 350                                                 │
└─────────────────────────────────────────────────────┘
                          ↓
┌─────────────────────────────────────────────────────┐
│ IDENTIFY, BY THE BIOS, ACTUAL RESOURCE REQUIREMENTS │
│ ASSOCIATED WITH SMART NIC.                          │
│ 360                                                 │
└─────────────────────────────────────────────────────┘
                          ↓
┌─────────────────────────────────────────────────────┐
│ ENUMERATE, BY THE BIOS, ACTUAL SYSTEM RESOURCES FOR │
│ EMULATED DEVICES OF SMART NIC.                      │
│ 370                                                 │
└─────────────────────────────────────────────────────┘
```

FIG. 3

MANAGING A SMART NETWORK INTERFACE CONTROLLER (NIC) OF AN INFORMATION HANDLING SYSTEM

BACKGROUND

Field of the Disclosure

The disclosure relates generally to information handling systems, and in particular to managing a smart network interface controller (NIC) of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for managing a smart network interface controller (NIC) of an information handling system includes: sending, by a basic input/output system (BIOS) of the information handling system, a request for estimated resource requirements associated with the smart NIC to a baseboard management controller (BMC) of the information handling system, the estimated resource requirements indicating estimated system resources likely to be required by one or more emulated devices of the smart NIC; receiving, by the BIOS, the estimated resource requirements from the BMC; initializing, by the BIOS, the estimated system resources likely to be required by the one or more emulated devices of the smart NIC based on the estimated resource requirements; enumerating, by the BIOS, system resources for one or more additional devices of the information handling system; determining, by the BIOS, that the smart NIC is in a ready state; identifying, by the BIOS, actual resource requirements associated with the smart NIC, the actual resource requirements indicating actual system resources required by the one or more emulated devices of the smart NIC; and enumerating, by the BIOS, the actual system resources for the one or more emulated devices of the smart NIC.

In one or more of the disclosed embodiments, the method further includes: determining, by the BIOS, that an emulated device of the one or more emulated devices of the smart NIC includes an operating system; and enumerating, by the BIOS, the operating system in a boot list.

In one or more of the disclosed embodiments, receiving the estimated resource requirements from the BMC includes: receiving, by the BMC, the request for estimated resource requirements from the BIOS; determining, by the BMC, that the smart NIC is installed in a device slot of the information handling system; identifying, by the BMC, an estimated number of busses likely to be required by the one or more emulated devices of the smart NIC; identifying, by the BMC, an estimated memory size likely to be required by the one or more emulated devices of the smart NIC; generating, by the BMC, the estimated resource requirements based on the estimated number of busses and the estimated memory size likely to be required by the one or more emulated devices of the smart NIC; and sending, by the BMC, the estimated resource requirements to the BIOS.

In one or more of the disclosed embodiments, determining that the smart NIC is in the ready state includes: sending, by the BIOS and to the BMC, a request to identify that an operating system of the smart NIC has been booted; receiving, by the BMC, the request to identify that the operating system of the smart NIC has been booted; identifying, by the BMC, that the operating system of the smart NIC has been booted; and sending, by the BMC and to the BIOS, a signal indicating that the smart NIC is in the ready state.

In one or more of the disclosed embodiments, initializing the estimated system resources likely to be required by the one or more emulated devices of the smart NIC based on the estimated resource requirements includes: reserving, by the BIOS, one or more busses of the information handling system for use by the one or more emulated devices of the smart NIC; and allocating, by the BIOS, one or more portions of memory for use by the one or more emulated devices of the smart NIC, the one or more portions of memory located in a configuration inventory of a root complex of the information handling system.

In one or more of the disclosed embodiments, enumerating the actual system resources for the one or more emulated devices of the smart NIC includes: installing, by the BIOS, one or more drivers associated with the one or more emulated devices of the smart NIC; assigning, by the BIOS, bus numbers to one or more busses of the information handling system, the one or more busses communicably coupled to the one or more emulated devices of the smart NIC; and assigning, by the BIOS, one or more portions of memory to the one or more emulated devices of the smart NIC, the one or more portions of memory located in a configuration inventory of a root complex of the information handling system.

In one or more of the disclosed embodiments, enumerating the actual system resources for the one or more emulated devices of the smart NIC comprises a hot-plug event.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 3 is a flowchart depicting selected elements of an embodiment of a method for managing a smart network interface controller (NIC) of an information handling system.

DESCRIPTION OF PARTICULAR EMBODIMENT(S)

Figure 1:
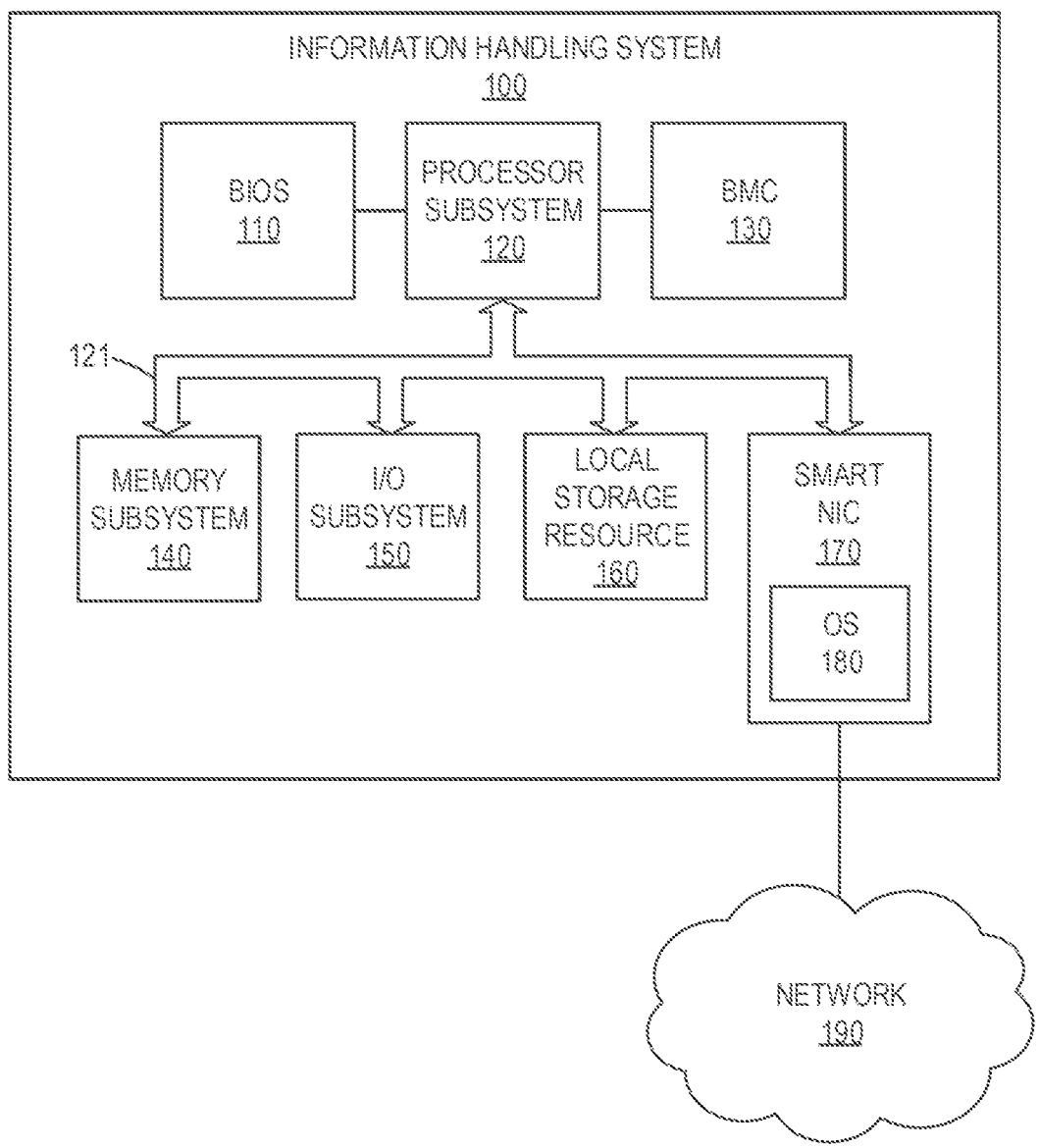
FIG. 1 is a block diagram of selected elements of an embodiment of a computing environment that includes an information handling system.

This document describes a method for managing a smart network interface controller (NIC) of an information handling system that includes: sending, by a basic input/output system (BIOS) of the information handling system, a request for estimated resource requirements associated with the smart NIC to a baseboard management controller (BMC) of the information handling system, the estimated resource requirements indicating estimated system resources likely to be required by one or more emulated devices of the smart NIC; receiving, by the BIOS, the estimated resource requirements from the BMC; initializing, by the BIOS, the estimated system resources likely to be required by the one or more emulated devices of the smart NIC based on the estimated resource requirements; enumerating, by the BIOS, system resources for one or more additional devices of the information handling system; determining, by the BIOS, that the smart NIC is in a ready state; identifying, by the BIOS, actual resource requirements associated with the smart NIC, the actual resource requirements indicating actual system resources required by the one or more emulated devices of the smart NIC; and enumerating, by the BIOS, the actual system resources for the one or more emulated devices of the smart NIC.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
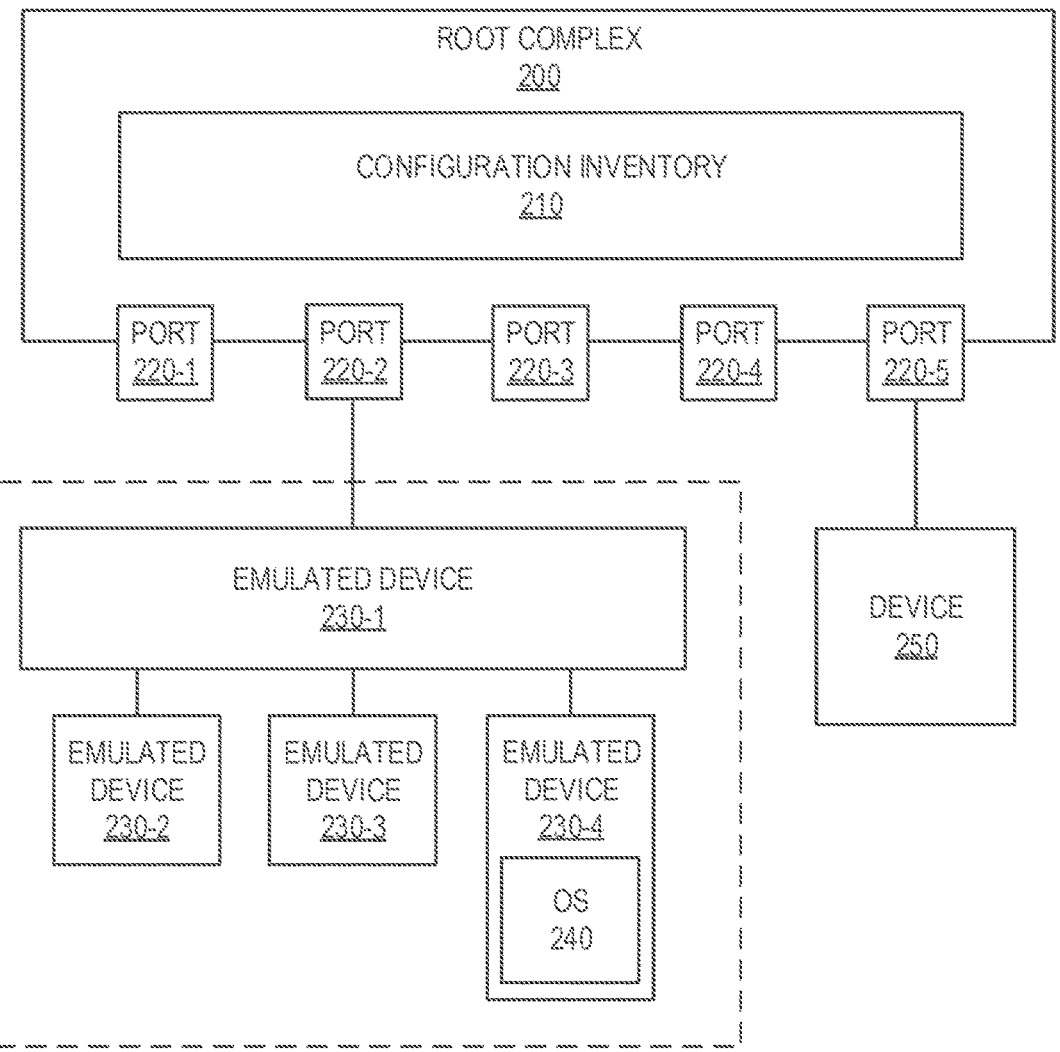
FIG. 2 is a block diagram of selected elements of an embodiment of an information handling system.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 120, which may comprise one or more processors, and system bus 121 that communicatively couples various system components to processor subsystem 120 including, for example, a memory subsystem 140, an I/O subsystem 150, and a local storage resource 160. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a basic input/output system (BIOS) 110, a baseboard management controller (BMC) 130, and a smart network interface controller (NIC) 170. Smart NIC 170 may include an operating system (OS) 180. In other embodiments, computing environment 195 may include additional, fewer, and/or different components than the components shown in FIG. 1.

In information handling system 100, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 140 and/or another component of information handling system 100). In the same or alternative embodiments, processor subsystem 120 may interpret and/or execute program instructions and/or process data stored remotely. In one embodiment, processor subsystem 120 may be or include a multi-core processor comprised of one or more processing cores disposed upon an integrated circuit (IC) chip. In other embodiments, processor subsystem 120 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 140 may comprise a system, device, or apparatus operable to retain and/or retrieve program instructions and/or data for a period of time (e.g., computer-readable media). Memory subsystem 140 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 150 may comprise a system, device, or apparatus generally operable to receive and/or transmit data to, from, and/or within information handling system 100. I/O subsystem 150 may represent, for example, a variety of communication interfaces, graphics interfaces, video interfaces, user input interfaces, and/or peripheral interfaces. In various embodiments, I/O subsystem 150 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 160 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In particular embodiments, network 190 may include one or more routers for routing data between client information handling systems 100 and server information handling systems 100. A device (e.g., a client information handling system 100 or a server information handling system 100) on network 190 may be addressed by a corresponding network address including, for example, an Internet protocol (IP) address, an Internet name, a Windows Internet name service (WINS) name, a domain name or other system name. In particular embodiments, network 190 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 190 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 190 and its various components may be implemented using hardware, software, or any combination thereof.

In one embodiment, BIOS 110 may be a suitable system, apparatus, or device operable to manage resources for information handling system 100. In particular, BIOS 110 may be or include a set of firmware instructions electronically stored within information handling system 100 that allows information handling system 100 to manage various resources and/or perform specific tasks. For example, information handling system 100 may use BIOS 110 to perform hardware initialization during a pre-boot sequence and/or to provide runtime services for other host services executing on information handling system 100. In one embodiment, BIOS 110 may send a request for estimated resource requirements associated with smart NIC 170 to BMC 130 during a booting process of smart NIC 170. That is, BIOS 110 may request estimated resource requirements indicating one or more estimated system resources likely to be required by one or more devices, or "emulated devices," to be emulated by smart NIC 170. In response, BIOS 110 may receive the estimated resource requirements from BMC 130 and may initialize the estimated system resources likely to be required by the one or more emulated devices of smart NIC 170 based on the estimated resource requirements.

Conventionally, BIOS may refrain from initializing system resources for a smart NIC until an operating system (e.g., ESXio) of the smart NIC has completed a booting process to ensure that each emulated device, or endpoint, associated with the smart NIC may be enumerated accordingly. In particular, BIOS may refrain from enumerating devices and booting an operating system of an information handling system until the operating system of the smart NIC has successfully completed a booting process. For example, conventional BIOS may refrain from enumerating one or more peripheral component interconnect express (PCIe) devices of an information handling until identifying a signal from the smart NIC indicating that the operating system of the smart NIC has completed the booting process. However, this delay in enumerating devices and booting the operating system of the information handling system may result in a user waiting several minutes (e.g., 2 to 3 minutes) for the information handling system to complete the booting process. In addition, conventional BIOS typically enumerates devices of the information handling system early in the information handling system booting process. Thus, a user may not be provided with keyboard and/or mouse support to bypass the wait time associated with the booting process of the smart NIC, thereby decreasing efficiency and overall user experience.

In contrast, BIOS 110 may enumerate system resources for one or more additional devices (e.g., device 250 illustrated in FIG. 2) of information handling system 100 without waiting for OS 180 of smart NIC 170 to complete a booting process. That is, BIOS 110 may initialize estimated system resources likely to be required by one or more emulated devices of smart NIC 170 and may continue enumerating system resources for one or more additional devices of information handling system 100 without causing a delay in the booting process of information handling system 100. For example, BIOS 110 may reserve one or more busses and/or allocate one or more portions of memory of information handling system 100 for use by one or more emulated devices of smart NIC 170 and may continue enumerating system resources for use by one or more additional devices of information handling system 100. Once BIOS 110 identifies that OS 180 of smart NIC 170 has successfully completed a booting process, or that smart NIC 170 is in a "ready state," BIOS 110 may identify actual resource requirements associated with smart NIC 170. That is, BIOS 110 may identify actual resource requirements indicating one or more actual system resources required by one or more emulated devices of smart NIC 170. Upon identifying the actual resource requirements, BIOS 110 may enumerate the actual system resources for the one or more emulated devices of smart NIC 170 accordingly. In particular, BIOS 110 may initiate a hot-plug event to enumerate the estimated system resources that were previously initialized. In doing so, BIOS 110 avoids the delay in enumerating devices and booting the operating system of information handling system 100 described above, thereby increasing efficiency and overall user experience. BIOS 110 is described in further detail with respect to FIG. 2.

In one embodiment, BMC 130 may be a suitable system, apparatus, or device operable to monitor a physical state of information handling system 100. In particular, BMC 130 may be or include an electronic hardware device that includes one or more sensors used to monitor physical parameters of information handling system 100 (e.g., power supply voltage, fan speed, humidity, temperature, and the like). BMC 130 may additionally include circuitry (e.g., processor, memory, network interface, and the like) that allows BMC 130 to communicate with one or more additional information handling systems and/or an administrator, or administrators, of computing environment 195. In one embodiment, BMC 130 may receive a request for estimated resource requirements from BIOS 110 during a booting process of smart NIC 170. In response, BMC 130 may determine whether smart NIC 170 is installed in, or otherwise communicably coupled to, a device slot (e.g., PCI device slot, PCIe device slot, and the like) of information handling system 100. Upon determining that smart NIC 170 is installed in a device slot, BMC 130 may generate the estimated resource requirements indicating estimated system resources likely to be required by one or more emulated devices of smart NIC 170. In particular, BMC 130 may generate estimated resource requirements based on an estimated number of busses and an estimated memory size likely to be required by the one or more emulated devices of smart NIC 170 and may send the estimated resource requirements to BIOS 110 as described above. BMC 130 is described in further detail with respect to FIG. 2.

In one embodiment, smart NIC 170 may be a suitable system, apparatus, or device operable to serve as an interface between information handling system 100 and a network 190. Smart NIC 170 may enable information handling system 100 to communicate over network 190 using a suitable transmission protocol and/or standard, including, but not limited to, transmission protocols and/or standards enumerated above with respect to the discussion of network 190. Network 190 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Smart NIC 170 may enable wired and/or wireless communications (e.g., NFC or Bluetooth) to and/or from information handling system 100.

In one embodiment, smart NIC 170 may include one or more processors (not shown in figure) and/or operating systems (e.g., OS 180) that allow smart NIC 170 to emulate one or more devices, thereby offloading tasks conventionally performed by a CPU (e.g., processor subsystem 120) of information handling system 100. As such, smart NIC 170 may be programmed to execute network software processes—and offload server processing—to perform various networking tasks on behalf of a CPU of information handling system 100. For example, smart NIC 170, or the devices emulated by smart NIC 170, may perform networking tasks such as packet capture, network management, and/or network visibility tasks. Further examples of networking tasks performed by smart NIC 170, or the devices emulated by smart NIC 170, may include any combination of encryption and/or decryption, firewall, Transmission Control Protocol/Internet Protocol (TCP/IP), and Hypertext Transfer Protocol (HTTP) tasks. Smart NIC 170 is described in further detail with respect to FIG. 2.

FIG. 2 is a block diagram of selected elements of an embodiment of an information handling system. In the embodiment illustrated in FIG. 2, information handling system 100 includes a root complex 200 communicably coupled to smart NIC 170 and an additional device 250. Root complex 200 includes a configuration inventory 210 and ports 220-1 through 220-5 (collectively referred to herein as "ports 220"). Smart NIC 170 includes emulated devices 230-1 through 230-4 (collectively referred to herein as "emulated devices 230"). Emulated device 230-4 includes operating system (OS) 240. In other embodiments, information handling system 100 may include additional, fewer, and/or different components than the components shown in FIG. 2.

In one embodiment, root complex 200 may be a suitable system, apparatus, or device operable to communicably couple a CPU (e.g., processor subsystem 120) and/or memory (e.g., memory subsystem 140) of information handling system 100 to one or more devices of information handling system 100. Specifically, root complex 200 may include circuitry operable to communicably couple processor subsystem 120 and/or memory subsystem 140 to smart NIC 170 and/or one or more additional devices (e.g., device 250) of information handling system 100. In the embodiment illustrated in FIG. 2, smart NIC 170 and device 250 may be communicably coupled to root complex 200 via ports 220. In one embodiment, BIOS 110 may access root complex 200 during a booting process of smart NIC 170 to initialize estimated system resources likely to be required by emulated devices 230 of smart NIC 170. In addition, BIOS 110 may access root complex 200 upon completion of the booting process of smart NIC 170 to enumerate the estimated system resources for the emulated devices 230 of smart NIC 170. Specifically, BIOS 110 may access configuration inventory 210 of root complex 200 to, both, initialize and enumerate the estimated system resources for the emulated devices 230 of smart NIC 170.

In one embodiment, configuration inventory 210 may be a suitable system, apparatus, or device operable to store information describing one or more devices communicably coupled to root complex 200. In particular, configuration inventory 210 may be or include a repository used to store information describing various memory mappings, and/or configuration tables, that define a memory layout, or configuration, accessible to the one or more devices communicably coupled to root complex 200. That is, configuration inventory 210 may include one or more portions of memory that each store memory-mapped I/O (MMIO) and/or bus configuration information associated with a device communicably coupled to root complex 200. For example, configuration inventory 210 may include a portion of memory therein that stores MMIO and bus configuration information associated with device 250. In one embodiment, system resources (e.g., MMIO and/or bus configuration information) may be enumerated by BIOS 110 during a booting process of information handling system 100. For example, BIOS 110 may enumerate system resources for device 250 during a driver execution environment (DXE) phase of the booting process of information handling system 100.

In one embodiment, each of the one or more devices communicably coupled to root complex 200 may include a respective memory mapping, and/or configuration table, that allows information handling system 100 to access a local memory, or local memories, of the device. For example, BIOS 110 may access configuration inventory 210 of root complex 200 to identify a memory mapping to emulated device 230-4 (shown in FIG. 2) that allows BIOS 110 to access OS 240 stored therein. In one embodiment, configuration inventory 210 may be or include a relational database in which system resources associated with one or more devices communicably coupled to root complex 200 are stored as entries within a list. In other embodiments, configuration inventory 210 may be or include a centralized database, distributed database, commercial database, operational database, and/or any other database management system suitable for storing information describing one or more devices communicably coupled to root complex 200.

In one embodiment, BIOS 110 may send a request for estimated resource requirements associated with smart NIC 170 to BMC 130. Specifically, BIOS 110 may send a request for estimated resource requirements associated with emulated devices 230 of smart NIC 170 to BMC 130 during a booting process of information handling system 100. For example, BIOS 110 may send an Intelligent Platform Management Interface (IPMI) command to BMC 130 during the booting process of information handling system 100 requesting estimated resource requirements associated with smart NIC 170. However, OS 180 (shown in FIG. 1) of smart NIC 170 may be undergoing a booting process in parallel with the booting process of information handling system 100. Before the booting process of OS 180 is complete, BMC 130 may be unable to explicitly identify resource requirements for each emulated device 230 of smart NIC 170 until each emulated device 230 has been exposed by OS 180. Therefore, BMC 130 may generate estimated resource requirements based on estimated system resources (e.g., worst-case system resource requirements) likely to be required by the emulated devices 230 of smart NIC 170 once OS 180 of smart MC 170 has completed the booting process.

To generate estimated resource requirements, BMC 130 may determine that smart NIC 170 is installed in, or otherwise communicably coupled to, a device slot (e.g., PCI device slot, PCIe device slot, and the like) of information handling system 100. Upon determining that smart NIC 170 is installed in a device slot, BMC 130 may identify estimated system resources likely to be required by emulated devices 230 of smart NIC 170. In one embodiment, BMC 130 may identify an estimated number of busses likely to be required by emulated devices 230 of smart NIC 170. For example, emulated device 230-1 shown in FIG. 2 may be or include an emulated PCIe switching device that requires one bus to communicably couple emulated device 230-1 to root complex 200 via port 220-2. Similarly, emulated devices 230-2 through 230-4 may each require one bus to communicably couple emulated devices 230-2 through 230-4 to emulated device 230-1. In this example, BMC 130 may identify that smart NIC 170 is likely to include four emulated devices 230 (i.e., emulated devices 230-1 through 230-4) and that the emulated devices 230 will likely require a total of four busses.

In one embodiment, BMC 130 may identify an estimated memory size likely to be required by emulated devices 230 of smart NIC 170. In the example described above, emulated device 230-1 (i.e., an emulated PCIe switching device) may require a 1 megabyte (MB) portion of memory within configuration inventory 210 to store MMIO and/or bus configuration information associated with emulated device 230-1. Similarly, emulated devices 230-2 through 230-4 may each require a 1 MB portion of memory. In this example, BMC 130 may identify that smart NIC 170 is likely to require a total of 4 MB of memory within configuration inventory 210 as each of the four emulated devices 230 will likely require a 1 MB portion of memory. In one embodiment, BMC 130 may generate estimated resource requirements based on the estimated number of busses and the estimated memory size likely to be required by emulated devices 230 of smart NIC 170. Upon generating the estimated resource requirements, BMC 130 may send the estimated resource requirements to BIOS 110.

In one embodiment, BIOS 110 may receive the estimated resource requirements from BMC 130 and may initialize estimated system resources likely to be required by emulated devices 230 of smart NIC 170 based on the estimated resource requirements. Specifically, BIOS 110 may reserve and/or allocate estimated system resources based on the estimated resource requirements generated by BMC 130. In one embodiment, BIOS 110 may reserve one or more busses of information handling system 100 for use by emulated devices 230 of smart NIC 170. In the example illustrated in FIG. 2, BIOS 110 may identify that smart NIC 170 will likely require a total of four busses (i.e., one bus for each emulated device 230-1 through 230-4) based on the estimated resource requirements and may reserve four busses for use by emulated devices 230-1 through 230-4 accordingly. In one embodiment, BIOS 110 may allocate one or more portions of memory (e.g., within configuration inventory 210) for use by emulated devices 230 of smart NIC 170. For example, BIOS 110 may identify that smart NIC 170 will likely require a total of 4 MB of memory within configuration inventory 210 (i.e., 1 MB for each emulated device 230-1 through 230-4) based on the estimated resource requirements and may allocate 4 MB of memory for use by emulated devices 230-1 through 230-4 accordingly.

In one embodiment, BIOS 110 may enumerate system resources for one or more additional devices of information handling system 100. In particular, BIOS 110 may initialize estimated system resources likely to be required by emulated devices 230 of smart NIC 170 as described above and may continue enumerating system resources for use by one or more additional devices (e.g., device 250 illustrated in FIG. 2) of information handling system 100 without waiting for OS 180 of smart NIC 170 to complete a booting process. For example, BIOS 110 may reserve one or more busses of information handling system 100 for use by emulated devices 230 of smart NIC 170 and may then assign bus numbers to one or more busses for use by one or more additional devices of information handling system 100. In another example, BIOS 110 may allocate a portion of memory within configuration inventory 210 starting at a memory address corresponding to port 220-2 of root complex 200 (i.e., the port to which smart NIC 170 is communicably coupled) and may then assign additional portions of memory for use by one or more additional devices communicably coupled to respective ports 220-3 through 220-5. By enumerating system resources for one or more additional devices of information handling system 100 without waiting for OS 180 of smart NIC 170 to complete a booting process, BIOS 110 avoids delay in enumerating devices and booting the operating system of information handling system 100, thereby increasing efficiency and overall user experience.

In one embodiment, BIOS 110 may determine that smart NIC 170 is in a ready state. Specifically, BIOS 110 may determine that OS 180 of smart NIC 170 has completed the booting process (i.e., smart NIC 170 is in ready state) and that system resources for emulated devices 230 of smart NIC 170 may be enumerated accordingly. To determine that smart NIC 170 is in a ready state, BIOS 110 may send a request to BMC 130 to identify that OS 180 of smart NIC 170 has completed the booting process. For example, BIOS 110 may send an IPMI command to BMC 130 during the booting process of information handling system 100 requesting BMC 130 to identify that OS 180 of smart NIC 170 has completed the booting process. In response, BMC 130 may receive the request and may identify that OS 180 has completed the booting process. Upon identifying that OS 180 has completed the booting process, BMC 130 may send a signal (e.g., assert a general purpose I/O (GPIO) signal, assert an interrupt signal, and the like) to BIOS 110 indicating that smart NIC 170 is in the ready state.

In one embodiment, upon determining that smart NIC 170 is in a ready state, BIOS 110 may identify actual resource requirements associated with smart NIC 170. That is, BIOS 110 may identify actual resource requirements indicating actual system resources required by emulated devices 230 of smart NIC 170 once actual resource requirements for each emulated device 230 of smart NIC 170 have been exposed by OS 180 in the ready state of smart NIC 170. In one embodiment, BIOS 110 may identify an actual number of busses required by emulated devices 230 of smart NIC 170. In the example illustrated in FIG. 2, BIOS 110 may identify that smart NIC 170 includes four emulated devices 230 (i.e., emulated devices 230-1 through 230-4) and that the emulated devices 230 will require a total of four busses. In one embodiment, BMC 130 may identify an actual memory size required by emulated devices 230 of smart NIC 170. For example, BIOS 110 may identify that smart NIC 170 requires a total of 4 MB of memory within configuration inventory 210 as each of the four emulated devices 230 may require a 1 MB portion of memory.

In one embodiment, once BIOS 110 has identified actual resource requirements associated with smart NIC 170, BIOS 110 may enumerate the actual system resources for emulated devices 230 of smart NIC 170. In particular, BIOS 110 may enumerate estimated system resources that were previously initialized for smart NIC 170 as described above without requiring information handling system 100 to shut down and/or reboot. In one embodiment, BIOS 110 may perform one or more hot-plug events to enumerate the actual system resources for emulated devices 230 of smart NIC 170 before booting an operating system of information handling system 100. Specifically, BIOS 110 may install one or more drivers associated with emulated devices 230 without requiring information handling system 100 to shut down and/or reboot. For example, BIOS 110 may call a Unified Extensible Firmware Interface (UEFI) function (e.g., Connect-Controller) to install drivers for each emulated device 230 of smart NIC 170.

In one embodiment, BIOS 110 may assign bus numbers to one or more busses of information handling system 100 communicably coupled to emulated devices 230 to enumerate actual system resources for emulated devices 230 of smart NIC 170. That is, BIOS 110 may assign bus numbers to the one or more busses of information handling system 100 that were previously reserved for use by emulated devices 230 of smart NIC 170 during the estimated system resource initialization process described above. For example, BIOS 110 may assign respective bus numbers to busses communicably coupling emulated devices 230-2 through 230-4 to emulated device 230-1 and a bus number to the bus communicably coupling emulated device 230-1 to root complex 200 via port 220-2. In one embodiment, BIOS 110 may store the assigned bus numbers in configuration inventory 210 of root complex 200.

In one embodiment, BIOS 110 may assign one or more portions of memory to emulated devices 230 of smart NIC 170 to enumerate the actual system resources for emulated devices 230 of smart NIC 170. In particular, BIOS 110 may assign one or more portions of memory to emulated devices 230 that were previously allocated for use by emulated devices 230 of smart NIC 170 during the estimated system resource initialization process described above. For example, BIOS 110 may assign a 4 MB portion of memory within configuration inventory 210 for use by emulated devices 230-1 through 230-4 (i.e., 1 MB for each emulated device 230-1 through 230-4).

In one embodiment, BIOS 110 may provide boot support for one or more emulated devices 230 of smart NIC 170 while enumerating the actual system resources for emulated devices 230 of smart NIC 170. In particular, BIOS 110 may determine that one or more emulated devices 230 of smart NIC 170 include an operating system, or operating systems, and may enumerate the operating system, or operating systems, in a boot list. In the example shown in FIG. 2, emulated device 230-4 may be or include an emulated non-volatile memory express (NVMe) device that includes an emulated memory partition storing OS 240. In this example, BIOS 110 may determine that emulated device 230-4 includes OS 240 when smart NIC 170 is in the ready state and may enumerate OS 240 in a boot list comprised of each operating system available to a user of information handling system 100 accordingly. In one embodiment, the boot list in which OS 240 has been enumerated may be electronically presented to the user such that the user may select OS 240 from the boot list to cause a booting process for OS 240.

In one embodiment, one or more host services (e.g., an operating system, system software/firmware, and the like) of information handling system 100 may perform one or more hot-plug events to enumerate the actual system resources for emulated devices 230 of smart NIC 170 after an operating system of information handling system 100 has completed a booting process. That is, for instances in which smart NIC 170 does not require boot support (i.e., no emulated devices 230 of smart NIC 170 include an operating system), BMC 130 may refrain from sending estimated resource requirements to BIOS 110 as described above with respect to FIG. 1. For example, BMC 130 may receive a request for estimated resource requirements from BIOS 110 and may determine that smart NIC 170 is installed in, or otherwise communicably coupled to, a device slot (e.g., PCI device slot, PCIe device slot, and the like) of information handling system 100. However, rather than sending estimated resource requirements to BIOS 110 such that BIOS 110 may initialize estimated system resources for emulated devices 230 of smart NIC 170 as described above, BMC 130 may instead wait until an operating system of information handling system 100 has completed a booting process and may then notify BIOS 110 of the actual resource requirements (e.g., assert a GPIO signal, assert an interrupt signal, and the like). In response, BIOS 110 may cause one or more host services to enumerate the actual system resources based on the actual resource requirements accordingly. For example, BIOS 110 may cause an operating system of information handling system 100 to perform one or more hot-plug events to enumerate the actual system resources. In this way, BMC 130 may further avoid delay in enumerating devices and booting the operating system of information handling system 100 for instances in which smart NIC 170 does not require boot support, thereby further increasing efficiency and overall user experience.

FIG. 3 is a flowchart depicting selected elements of an embodiment of a method for managing a smart network interface controller (NIC) of an information handling system. It is noted that certain operations described in method 300 may be optional or may be rearranged in different embodiments.

Method 300 may begin at step 310, where a basic input/output system (BIOS) of the information handling system may send a request for estimated resource requirements associated with the smart NIC to a baseboard management controller (BMC) of the information handling system. The estimated resource requirements may indicate estimated system resources likely to be required by one or more emulated devices of the smart NIC. For example, BIOS 110 may send a request for estimated resource requirements associated with smart NIC 170 to BMC 130 during a booting process of smart NIC 170 as described above with respect to FIG. 1. In steps 320 and 330, BIOS may receive the estimated resource requirements from the BMC and may initialize the estimated system resources likely to be required by the one or more emulated devices of the smart NIC based on the estimated resource requirements. For example, BIOS 110 may reserve one or more busses of information handling system 100 for use by emulated devices 230 of smart NIC 170 and/or allocate one or more portions of memory (e.g., within configuration inventory 210) for use by emulated devices 230 of smart NIC 170 as described above with respect to FIG. 2. In step 340, BIOS may enumerate system resources for one or more additional devices of the information handling system. For example, BIOS 110 may reserve one or more busses of information handling system 100 for use by emulated devices 230 of smart NIC 170 and may then assign bus numbers to one or more busses for use by one or more additional devices of information handling system 100 as described above with respect to FIG. 2. In step 350, BIOS may determine that smart NIC is in a ready state. For example, BIOS 110 may send a request to BMC 130 to identify that OS 180 of smart NIC 170 has completed the booting process and may receive a signal (e.g., assert a general purpose I/O (GPIO) signal, assert an interrupt signal, and the like) from BMC 130 indicating that smart NIC 170 is in the ready state as described above with respect to FIG. 2. In step 360, BIOS may identify actual resource requirements associated with the smart NIC. The actual system resources may indicate actual system resources required by the one or more emulated devices of the smart NIC. For example, BIOS 110 may identify actual resource requirements indicating actual system resources required by emulated devices 230 of smart NIC 170 once actual resource requirements for each emulated device 230 of smart NIC 170 have been exposed by OS 180 as described above with respect to FIG. 2. In step 370, BIOS may enumerate the actual system resources for the one or more emulated devices of the smart NIC. For example, BIOS 110 may perform one or more hot-plug events to enumerate the actual system resources for emulated devices 230 of smart NIC 170 before booting an operating system of information handling system 100 as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a smart network interface controller (NIC) of an information handling system, the method comprising:

sending, by a basic input/output system (BIOS) of the information handling system, a request for estimated resource requirements associated with the smart NIC to a baseboard management controller (BMC) of the information handling system, the estimated resource requirements indicating estimated system resources likely to be required by one or more emulated devices of the smart NIC;

receiving, by the BIOS, the estimated resource requirements from the BMC;

initializing, by the BIOS, the estimated system resources likely to be required by the one or more emulated devices of the smart NIC based on the estimated resource requirements;

enumerating, by the BIOS, system resources for one or more additional devices of the information handling system;
determining, by the BIOS, that the smart NIC is in a ready state;
identifying, by the BIOS, actual resource requirements associated with the smart NIC, the actual resource requirements indicating actual system resources required by the one or more emulated devices of the smart NIC; and
enumerating, by the BIOS, the actual system resources for the one or more emulated devices of the smart NIC.

2. The method of claim 1, further comprising:
determining, by the BIOS, that an emulated device of the one or more emulated devices of the smart NIC includes an operating system; and
enumerating, by the BIOS, the operating system in a boot list.

3. The method of claim 1, wherein receiving the estimated resource requirements from the BMC comprises:
receiving, by the BMC, the request for estimated resource requirements from the BIOS;
determining, by the BMC, that the smart NIC is installed in a device slot of the information handling system;
identifying, by the BMC, an estimated number of busses likely to be required by the one or more emulated devices of the smart NIC;
identifying, by the BMC, an estimated memory size likely to be required by the one or more emulated devices of the smart NIC;
generating, by the BMC, the estimated resource requirements based on the estimated number of busses and the estimated memory size likely to be required by the one or more emulated devices of the smart NIC; and
sending, by the BMC, the estimated resource requirements to the BIOS.

4. The method of claim 1, wherein determining that the smart NIC is in the ready state comprises:
sending, by the BIOS and to the BMC, a request to identify that an operating system of the smart NIC has been booted;
receiving, by the BMC, the request to identify that the operating system of the smart NIC has been booted;
identifying, by the BMC, that the operating system of the smart NIC has been booted; and
sending, by the BMC and to the BIOS, a signal indicating that the smart NIC is in the ready state.

5. The method of claim 1, wherein initializing the estimated system resources likely to be required by the one or more emulated devices of the smart NIC based on the estimated resource requirements comprises:
reserving, by the BIOS, one or more busses of the information handling system for use by the one or more emulated devices of the smart NIC; and
allocating, by the BIOS, one or more portions of memory for use by the one or more emulated devices of the smart NIC, the one or more portions of memory located in a configuration inventory of a root complex of the information handling system.

6. The method of claim 1, wherein enumerating the actual system resources for the one or more emulated devices of the smart NIC comprises:
installing, by the BIOS, one or more drivers associated with the one or more emulated devices of the smart NIC;
assigning, by the BIOS, bus numbers to one or more busses of the information handling system, the one or more busses communicably coupled to the one or more emulated devices of the smart NIC; and
assigning, by the BIOS, one or more portions of memory to the one or more emulated devices of the smart NIC, the one or more portions of memory located in a configuration inventory of a root complex of the information handling system.

7. The method of claim 1, wherein enumerating the actual system resources for the one or more emulated devices of the smart NIC comprises a hot-plug event.

8. One or more computer-readable non-transitory storage media embodying software that is operable when executed to:
send, by a basic input/output system (BIOS) of an information handling system, a request for estimated resource requirements associated with a smart network interface controller (NIC) to a baseboard management controller (BMC) of the information handling system, the estimated resource requirements indicating estimated system resources likely to be required by one or more emulated devices of the smart NIC;
receive, by the BIOS, the estimated resource requirements from the BMC;
initialize, by the BIOS, the estimated system resources likely to be required by the one or more emulated devices of the smart NIC based on the estimated resource requirements;
enumerate, by the BIOS, system resources for one or more additional devices of the information handling system;
determine, by the BIOS, that the smart NIC is in a ready state;
identify, by the BIOS, actual resource requirements associated with the smart NIC, the actual resource requirements indicating actual system resources required by the one or more emulated devices of the smart NIC; and
enumerate, by the BIOS, the actual system resources for the one or more emulated devices of the smart NIC.

9. The media of claim 8, wherein the software is further operable when executed to:
determine, by the BIOS, that an emulated device of the one or more emulated devices of the smart NIC includes an operating system; and
enumerate, by the BIOS, the operating system in a boot list.

10. The media of claim 8, wherein to receive the estimated resource requirements from the BMC, the software is further operable when executed to:
receive, by the BMC, the request for estimated resource requirements from the BIOS;
determine, by the BMC, that the smart NIC is installed in a device slot of the information handling system;
identify, by the BMC, an estimated number of busses likely to be required by the one or more emulated devices of the smart NIC;
identify, by the BMC, an estimated memory size likely to be required by the one or more emulated devices of the smart NIC;
generate, by the BMC, the estimated resource requirements based on the estimated number of busses and the estimated memory size likely to be required by the one or more emulated devices of the smart NIC; and
send, by the BMC, the estimated resource requirements to the BIOS.

11. The media of claim 8, wherein to determine that the smart NIC is in the ready state, the software is further operable when executed to:

send, by the BIOS and to the BMC, a request to identify that an operating system of the smart NIC has been booted;

receive, by the BMC, the request to identify that the operating system of the smart NIC has been booted;

identify, by the BMC, that the operating system of the smart NIC has been booted; and send, by the BMC and to the BIOS, a signal indicating that the smart NIC is in the ready state.

12. The media of claim 8, wherein to initialize the estimated system resources likely to be required by the one or more emulated devices of the smart NIC based on the estimated resource requirements, the software is further operable when executed to:

reserve, by the BIOS, one or more busses of the information handling system for use by the one or more emulated devices of the smart NIC; and allocate, by the BIOS, one or more portions of memory for use by the one or more emulated devices of the smart NIC, the one or more portions of memory located in a configuration inventory of a root complex of the information handling system.

13. The media of claim 8, wherein to enumerate the actual system resources for the one or more emulated devices of the smart NIC, the software is further operable when executed to:

install, by the BIOS, one or more drivers associated with the one or more emulated devices of the smart NIC;

assign, by the BIOS, bus numbers to one or more busses of the information handling system, the one or more busses communicably coupled to the one or more emulated devices of the smart NIC; and assign, by the BIOS, one or more portions of memory to the one or more emulated devices of the smart NIC, the one or more portions of memory located in a configuration inventory of a root complex of the information handling system.

14. The media of claim 8, wherein enumerating the actual system resources for the one or more emulated devices of the smart NIC comprises a hot-plug event.

15. A computing environment, comprising:

an information handling system including one or more processors; and one or more computer-readable non-transitory storage media coupled to one or more of the processors and comprising instructions operable when executed by one or more of the processors to cause the system to:

send, by a basic input/output system (BIOS) of the information handling system, a request for estimated resource requirements associated with a smart network interface controller (NIC) to a baseboard management controller (BMC) of the information handling system, the estimated resource requirements indicating estimated system resources likely to be required by one or more emulated devices of the smart NIC;

receive, by the BIOS, the estimated resource requirements from the BMC;

initialize, by the BIOS, the estimated system resources likely to be required by the one or more emulated devices of the smart NIC based on the estimated resource requirements;

enumerate, by the BIOS, system resources for one or more additional devices of the information handling system;

determine, by the BIOS, that the smart NIC is in a ready state;

identify, by the BIOS, actual resource requirements associated with the smart NIC, the actual resource requirements indicating actual system resources required by the one or more emulated devices of the smart NIC; and enumerate, by the BIOS, the actual system resources for the one or more emulated devices of the smart NIC.

16. The computing environment of claim 15, wherein the processors are further operable when executed to:

determine, by the BIOS, that an emulated device of the one or more emulated devices of the smart NIC includes an operating system; and enumerate, by the BIOS, the operating system in a boot list.

17. The computing environment of claim 15, wherein to receive the estimated resource requirements from the BMC, the processors are further operable when executed to:

receive, by the BMC, the request for estimated resource requirements from the BIOS;

determine, by the BMC, that the smart NIC is installed in a device slot of the information handling system;

identify, by the BMC, an estimated number of busses likely to be required by the one or more emulated devices of the smart NIC;

identify, by the BMC, an estimated memory size likely to be required by the one or more emulated devices of the smart NIC;

generate, by the BMC, the estimated resource requirements based on the estimated number of busses and the estimated memory size likely to be required by the one or more emulated devices of the smart NIC; and send, by the BMC, the estimated resource requirements to the BIOS.

18. The computing environment of claim 15, wherein to determine that the smart NIC is in the ready state, the processors are further operable when executed to:

send, by the BIOS and to the BMC, a request to identify that an operating system of the smart NIC has been booted;

receive, by the BMC, the request to identify that the operating system of the smart NIC has been booted;

identify, by the BMC, that the operating system of the smart NIC has been booted; and send, by the BMC and to the BIOS, a signal indicating that the smart NIC is in the ready state.

19. The computing environment of claim 15, wherein to initialize the estimated system resources likely to be required by the one or more emulated devices of the smart NIC based on the estimated resource requirements, the processors are further operable when executed to:

reserve, by the BIOS, one or more busses of the information handling system for use by the one or more emulated devices of the smart NIC; and allocate, by the BIOS, one or more portions of memory for use by the one or more emulated devices of the smart NIC, the one or more portions of memory located in a configuration inventory of a root complex of the information handling system.

20. The computing environment of claim 15, wherein to enumerate the actual system resources for the one or more emulated devices of the smart NIC, the processors are further operable when executed to:

install, by the BIOS, one or more drivers associated with the one or more emulated devices of the smart NIC;

assign, by the BIOS, bus numbers to one or more busses of the information handling system, the one or more busses communicably coupled to the one or more emulated devices of the smart NIC; and assign, by the BIOS, one or more portions of memory to the one or more emulated devices of the smart NIC, the one or more portions of memory located in a configuration inventory of a root complex of the information handling system.

\* \* \* \* \*